United States Patent [19]

Izumi

[11] 4,196,795

[45] Apr. 8, 1980

[54] AUTOMATIC BRAKE SHOE CLEARANCE ADJUSTING DEVICE

[75] Inventor: Shinichi Izumi, Yokohama, Japan

[73] Assignee: Tokico Ltd., Kanagawa, Japan

[21] Appl. No.: 907,032

[22] Filed: May 17, 1978

[30] Foreign Application Priority Data

Aug. 20, 1977 [JP] Japan .......................... 52-111674[U]

[51] Int. Cl.$^2$ ............................................. F16D 65/56
[52] U.S. Cl. .................... 188/79.5 P; 192/111 A
[58] Field of Search ................ 188/79.5 R, 79.5 GE, 188/79.5 GC, 79.5 K, 79.5 P, 196 BA, 79.5 S; 192/111 A, 75, 99 B

[56] References Cited

U.S. PATENT DOCUMENTS 4,051,928  10/1977  Hayashida ..................... 188/79.5 P

FOREIGN PATENT DOCUMENTS 1402527  8/1975  United Kingdom ............ 188/79.5 GE

*Primary Examiner*—George E. A. Halvosa
*Attorney, Agent, or Firm*—Wenderoth, Lind & Ponack

[57] ABSTRACT

An automatic brake shoe clearance adjusting device includes a first strut member having a threaded stem screw-threadingly engaging with an adjusting nut, a second strut member having a hollow portion for receiving the threaded stem and abutting with the adjusting nut, an adjusting lever mounted on a hand brake lever by a pin and cooperating with the adjusting nut, and a spring acting between the hand brake lever and the adjusting lever for urging the adjusting lever against a stop formed on the hand brake lever. There is provided, at least on a line passing through the center of the pin and the stop, an element for restricting movement of the adjusting lever in the direction of the axis of the pin.

7 Claims, 20 Drawing Figures

AUTOMATIC BRAKE SHOE CLEARANCE ADJUSTING DEVICE

BACKGROUND OF THE INVENTION

This invention relates generally to vehicle brakes, and particularly to an improved automatic brake shoe clearance adjusting device for shoe drum type brakes.

One of the conventional automatic brake shoe clearance adjusting devices comprises a first strut member with a fork-shaped portion on one end and threaded stem portion on the other end, a second strut member having a hollow end portion for loosely receiving the threaded stem portion of the first strut member, and an adjusting nut screw-threadingly engaging with the threaded stem and abutting with the open end of the hollow end portion of the second strut member and having ratchet teeth on the outer circumference. An adjusting lever having a pawl portion cooperating with the ratchet teeth is pivotally mounted on a hand brake lever, and a bent portion of the adjusting lever is normally biassed against a shoulder of the hand brake lever acting as a stop by means of a spring extending between the hand brake lever and the adjusting lever. The adjusting lever is mounted on a pin secured to the hand brake lever with some amount of play or degree of freedom of movement in the direction of the thickness of the hand brake lever or the direction of the axis of the pin so that the pawl portion of the adjusting lever can move towards or away from the ratchet teeth of the adjusting nut. However, the bent portion of the adjusting lever can also move in the direction of the thickness of the hand brake lever due to the play aforementioned, and thus there is a tendency for the adjusting lever to disengage from the stop of the hand brake lever due to vibrations of the vehicle in usage or due to mishandling of a tool in assembling the brake. It is possible to overcome such drawbacks by reducing the amount of play, but the movement of the adjusting lever in passing over the ratchet teeth will accordingly be restricted, and the adjusting nut may be rotated in the reverse direction upon releasing the hand brake lever.

SUMMARY OF THE INVENTION

An object of the present invention is to overcome drawbacks aforementioned by providing, at least on a line passing the center of the pin pivotally mounting the adjusting lever on the hand brake lever and the stop formed on the hand brake lever, means for restricting rocking movement of the adjusting lever relative to the hand brake lever in the direction of the thickness of the hand brake lever (or of the axis of the pin), thereby preventing disengagement of the adjusting lever from the stop in the direction of the thickness of the hand brake lever.

BRIEF DESCRIPTION OF THE DRAWINGS

Some embodiments of the present invention will, by way of example, be described with reference to the accompanying drawings, in which;

FIG. 5b is a cross-sectional view showing a projection formed on the adjusting lever of FIGS. 4 and 5a;

FIG. 9b is a plan view of FIG. 9a;

FIG. 10b is a cross-sectional view taken along line X—X in FIG. 10a;

FIG. 12b is a right side view of FIG. 12a;

DETAILED DESCRIPTION OF THE INVENTION

Figure 1:
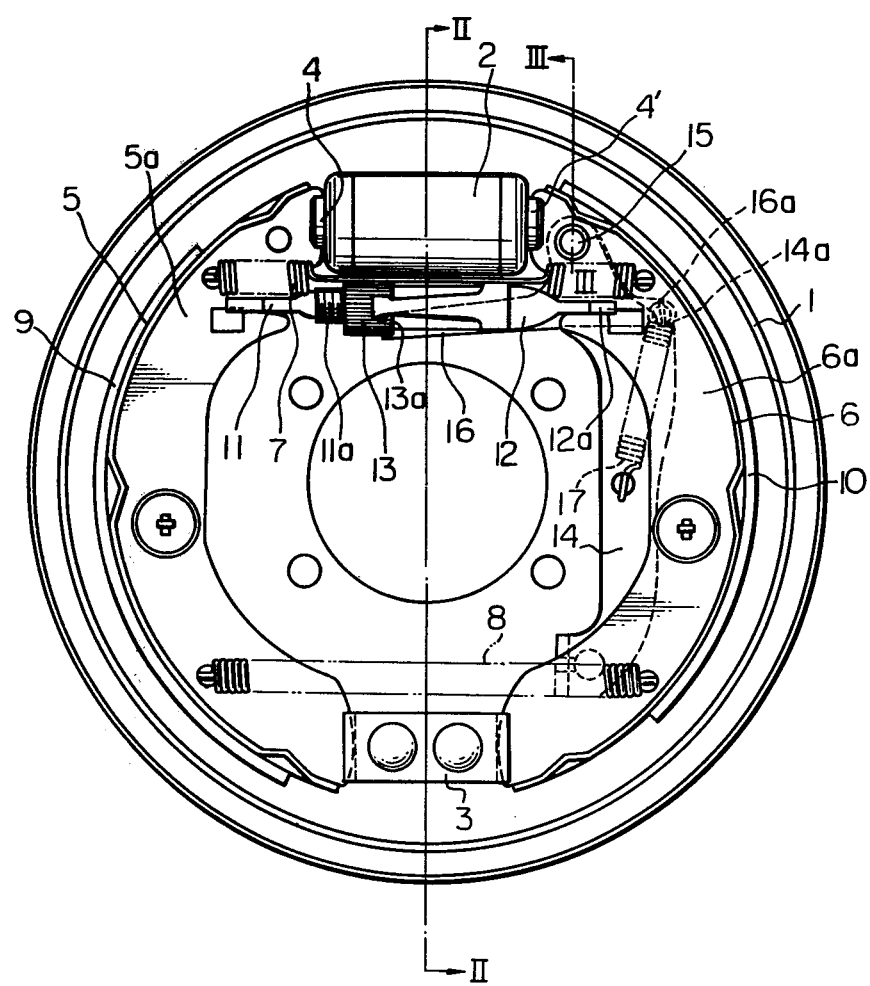
FIG. 1 is a front view of a disc brake according to the present invention.
Figure 2:
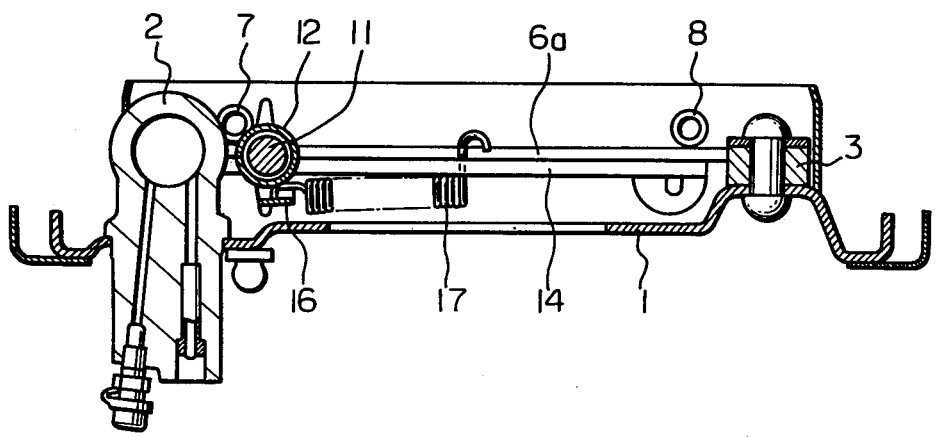
FIG. 2 is a cross-sectional view taken along line II—II in FIG. 1.
Figure 3:
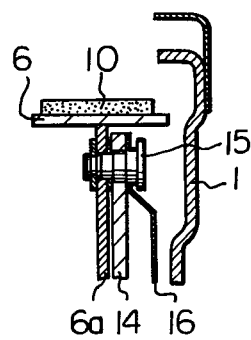
FIG. 3 is a cross-sectional view taken along line III—III in FIG. 1.

The shoe drum brake shown in FIGS. 1, 2 and 3 comprises a stationary backing plate 1 mounted to a non-rotatable part (not shown) of a vehicle, and having a wheel cylinder 2 and an anchor 3 secured thereon at diametrically opposed positions. Two pistons 4 and 4' are fitted in the wheel cylinder 2 and are slidable in opposite directions therein. First ends of webs 5a and 6a of arcuate brake shoes 5 and 6 engage respectively with the pistons 4 and 4', and the other ends of webs 5a and 6a abut the anchor 3. The brake shoes 5 and 6 are urged in directions away from a brake drum (not shown) by return springs 7 and 8 extending between the brake shoes 5 and 6. Brake linings 9 and 10 are mounted on brake shoes 5 and 6, respectively, on the sides thereof adjacent to the brake drum.

Figure 4:
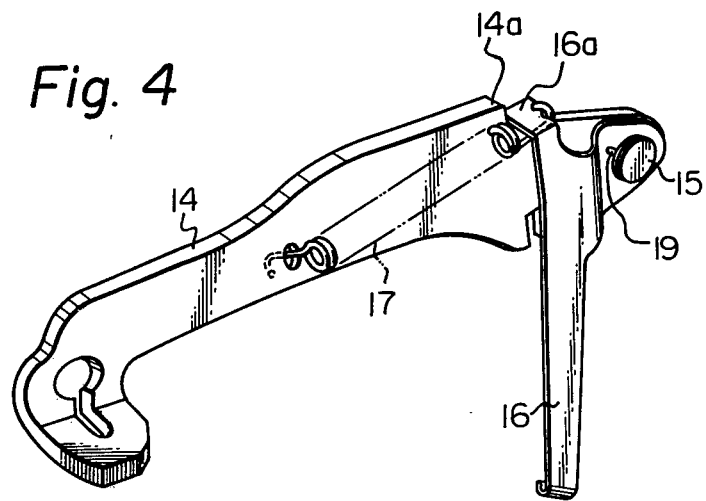
FIG. 4 is a perspective view of an assembly of the hand brake lever and adjusting lever of FIG. 1.

A fork-shaped end of a first strut member 11 engages with a recess formed in the web 5a of the brake shoe 5 at a position adjacent to the wheel cylinder 2, and a fork-shaped end of a second strut member engages with the web 6a of the brake shoe 6. A threaded stem portion or another end portion 11a of the first strut member 11 slidably extends into a hollow end portion of the second strut member 12. The threaded stem portion 11a of the first strut member 11 screw-threadingly engages with an adjusting nut 13 having ratchet teeth on the outer periphery thereof, and one side surface 13a of the nut 13 abuts with the open end of the second strut member 12. A hand brake lever 14 is pivotally mounted on the brake shoe 6 by a pin 15, and the pin 15 also acts to pivotally mount on the hand brake lever 14 an adjusting lever 16 having a pawl portion for engaging with the ratchet teeth of the adjusting nut 13. A shoulder portion 14a acting as a stop is formed on the hand brake lever 14, as shown in FIGS. 1 and 4, and a projection or bent portion 16a formed on one end (remote from the pawl portion) of the adjusting lever 16 normally engages with the stop 14a by means of a spring 17 extending between the hand brake lever 14 and the adjusting lever 16. The adjusting lever 16 can rotate in the counterclockwise direction in FIG. 1 with respect to hand brake lever 14 around the pin 15, and also can move around and along the pin 15 relative to the plane of FIG. 1 by some amount so that the pawl portion of the adjusting lever 16 can move towards and away from the ratchet teeth of the adjusting nut 13. Namely, the adjusting lever 16 is mounted on a stem portion of the pin 15 with some amount of play or degree of freedom of movement in the direction of the thickness of the hand brake lever 14.

Figure 5A:
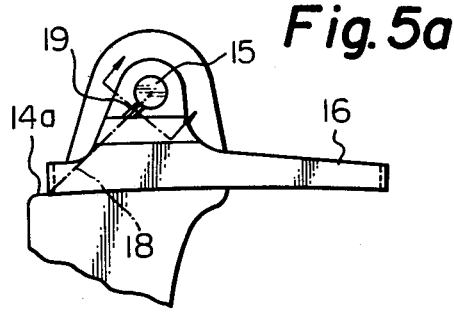
FIG. 5a is a plan view showing a portion of the assembly of FIG. 4.
Figure 5B:

A projection 19 acting as means for restricting movement of the adjusting lever according to the present invention is formed on the adjusting lever 16, as shown in FIGS. 5a and 5 b, and projects generally on a line 18 passing through the stop 14a of the hand brake lever 14 and the center of the pin 15 and abuts with a flange or a head portion 15a of the pin 15. Thus, the projection 19 effectively restricts movement of the adjusting lever 16 with respect to the side surface of the hand brake lever 14 such that the adjusting lever 16 rotates around the line 18. Therefore, the pawl portion of the lever 16 can sufficiently move towards and away from the ratchet teeth of the adjusting nut 13 while the bent portion 16a of the lever 16 reliably engages with the stop 14a. Incidentally, the fork-shaped end of the second strut member 12 also engages with the hand brake lever 14 so that the brake shoes 5 and 6 can expand against the force of return springs 7 and 8 by operating the hand brake lever 14.

Figure 6:
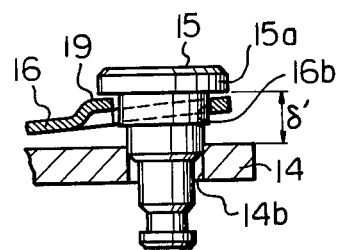
FIGS. 6 and 7 are enlarged partial views showing the assembling process of the assembly of FIG. 4.
Figure 7:
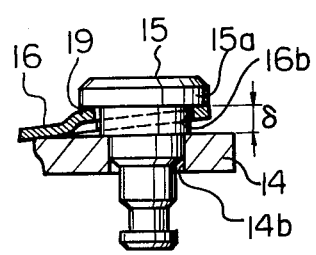

In assembling the adjusting lever 16 on the hand brake lever 14, the pin 15 is firstly inserted through an opening 16b of the adjusting lever 16 and is located to align with an opening 14b of the hand brake lever 14, and is forcibly but partially inserted into the opening 14b, as shown in FIG. 6. The clearance or play of the adjusting lever 16 in the direction of the thickness of the hand brake lever or the clearance δ' defined between the head portion 15a of the pin 15 and the hand brake lever 14 is larger than the normal clearance δ (as shown in FIG. 7), thus, it is possible to rotate the adjusting lever 16 with respect to the hand brake lever 14. The spring 17 can easily be mounted between the hand brake lever 14 and the adjusting lever 16 and, then, the adjusting lever 16 is rotated around the pin 15 against the force of the spring 17 so that the bent portion 16a of the adjusting lever 16 aligns with the stop 14a of the hand brake lever 14. By rockingly move the adjusting lever 16, the bent portion 16a can engage with the stop 14a.

Thereafter, the pin 15 is tightly inserted into the hand brake lever 14 as shown in FIG. 7 so that the normal clearance δ is left between the head portion 15a of the pin 15 and the hand brake lever 14. The projection 19 formed on the adjusting lever 16 abuts with the head portion 15a of the pin 15 so as to allow rocking movement of the adjusting lever 16 in the direction of the thickness of the hand brake lever 14 only around line 18, thus, engagement between the bent portion 16a of the lever 14 and the stop 14a will not be accidentally released.

Figure 8:
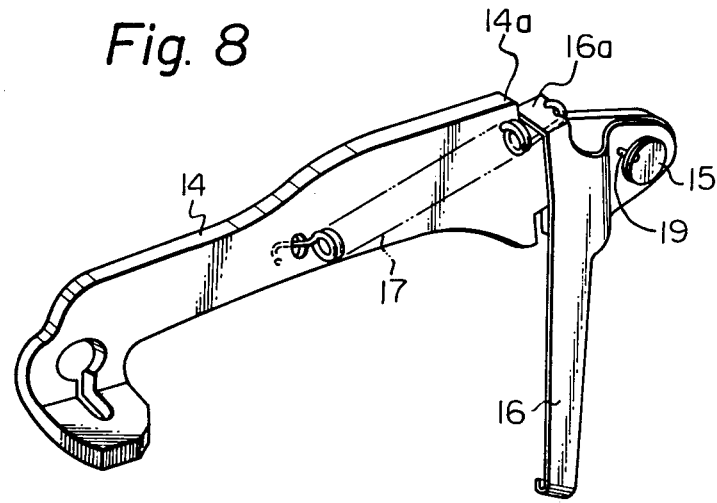
FIG. 8 is a view similar to FIG. 4, but showing a second embodiment wherein the projection is formed on a head portion of the pin.
Figure 9A:
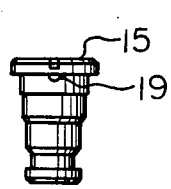
FIG. 9a is an enlarged side view of the pin of the second embodiment.
Figure 9B:
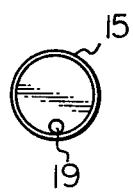
Figure 9C:
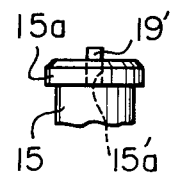
FIGS. 9c and 9d are views showing forming process of a projection of a modified form.
Figure 9D:
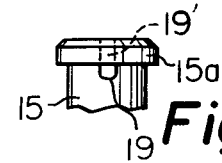

FIGS. 8, 9a and 9b show a modified form wherein projection 19 is formed on the pin 15. The projection 19 is located on a line connecting the center of the pin 15 with the stop 14a of the hand brake lever 14. FIGS. 9c and 9d show the process for forming the projection 19 on the pin 15. In FIG. 9c a pin 19' has been partially inserted into an opening 15a' formed in the head portion 15a of the pin 15. When the adjusting lever 16 and the spring 17 are assembled with the hand brake lever 14, the pin 19' is further pressed into the opening 15a' as shown in FIG. 9d to form a downwardly extending projection 19.

Figure 10A:
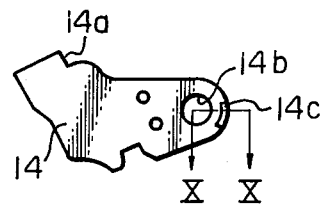
FIG. 10a is a plan view showing a portion of hand brake lever having thereon the projection according to the invention.
Figure 10B:
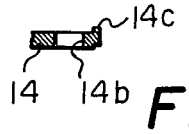

FIGS. 10a and 10b show another embodiment of the present invention wherein the projection 14c is formed on the hand brake lever 14 such that the projection 19 projects toward the adjusting lever 16 at a location generally on an extension of a line connecting the stop 14a and the center of the pin fitting within opening 14b of the hand brake lever 14.

Figure 11:
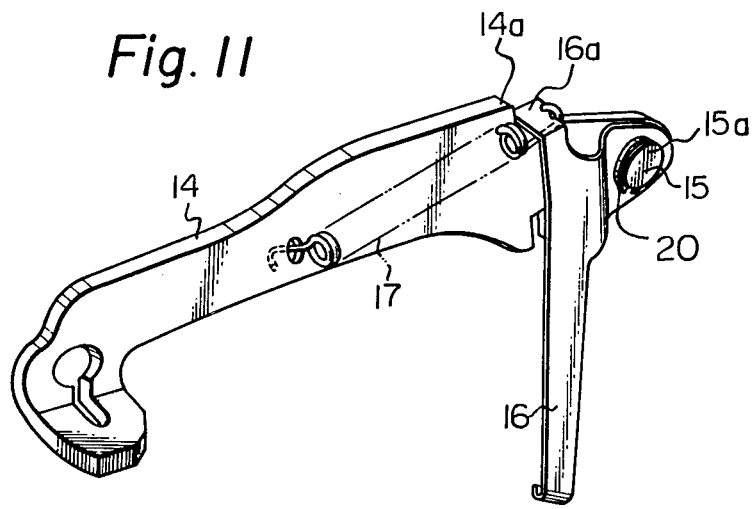
FIG. 11 is a view similar to FIG. 4 but showing another embodiment of the invention.
Figure 12A:
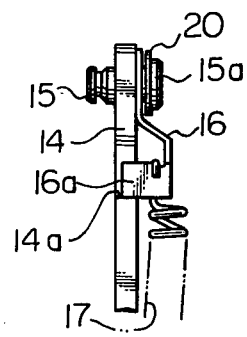
FIG. 12a is a view showing the essential portion of FIG. 11 as viewed from the upper side thereof.
Figure 12B:
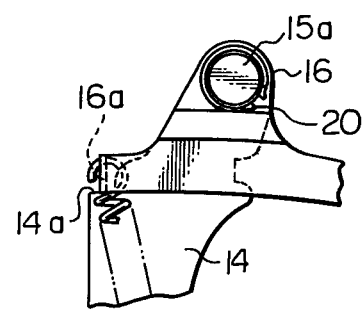

FIGS. 11, 12a and 12b show a further modified form of the present invention, in which, a spacer having the form of conventional C-shaped clip formed of a sheet-like material or a rod-shaped member is interposed between the head portion 15a of the pin and the adjusting lever 16 so as to restrict movement of the adjusting lever in the direction of the thickness of the hand brake lever to a very small range such that the bent portion 16a of the adjusting lever 16 will not disengage from the stop 14a on the hand brake lever while the pawl portion (the lower end as viewed in FIG. 11) of the adjusting lever can move towards or away from the ratchet teeth of adjusting nut 13. In assembling the adjusting lever 16 with the hand brake lever 14 as illustrated in FIG. 11, firstly, the lever 16 is mounted on the lever 14 by means of the pin 15. At that time, there is sufficient clearance between the head portion 15a of the pin 15 and the lever 14 such that the lever 16 can freely rotate around the pin 15. Nextly, the spring 17 is mounted between levers 14 and 16 and the bent portion 16a of the lever 16 is located to engage with the stop 14a of the lever 14. Thereafter, the spacer 20 is inserted between the head portion 15a and the adjusting lever 16. The thickness of the spacer 20 is so determined that the adjusting lever can rockingly move in the direction of the thickness of the hand brake lever 14 by a small range so as to prevent accidental disengagement of the bent portion 16a from the stop 14a and to allow the pawl portion of the lever 16 to ride over the teeth of the adjusting nut 13 as desired, and so that when the spacer 20 is not mounted on the pin 15 the spring 17 can easily be assembled on levers 14 and 16.

Figure 13:
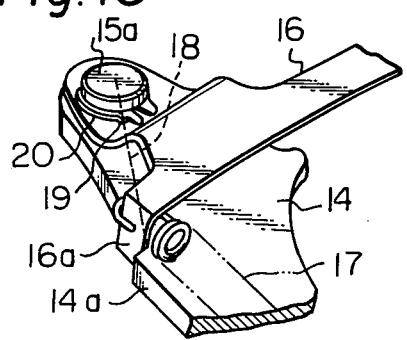
FIG. 13 is a slightly enlarged perspective view similar to FIG. 11 but showing a modified form.
Figure 14:
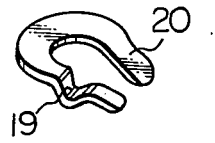
FIG. 14 is a perspective view of the washer illustrated in FIG. 13.

FIGS. 13 and 14 show a modified form of the spacer 20. As shown in FIG. 14, a projection 19 is formed on the spacer 20, and the spacer 20 is mounted on the pin 15 and between the head portion 15a of the pin 15 and the adjusting lever 16, with the projection 19 being located generally along line 18 which extends between the center of the pin 15 and the stop 14a of the hand brake lever 14, similar to the embodiments of FIG. 4 to FIG. 9d inclusive. The projection 19 of the spacer 20 effectively restricts rocking movement of the adjusting lever 14 in a plane defined by the line 18 and the axis of the pin 15 to a small range while allowing rocking movement of the lever 14 around the line 18 by a relatively large range. Therefore, it is possible to afford a relatively large dimensional tolerance as compared with the embodiment of FIG. 11, thus reducing machining or assembling costs.

As described heretofore in detail, the shoe drum brake according to the present invention comprises an adjusting lever pivotally mounted on a hand brake lever for rotating an adjusting nut, and means for restricting rocking movement of the adjusting lever with respect to the hand brake lever in the direction of the thickness of the hand brake lever. Thus, one end portion of the adjusting lever which normally engages with a stop formed on the hand brake lever will not accidentally disengage from the stop, thereby reliably assuring the brake shoe clearance adjusting function.

What is claimed is:

1. In an automatic brake shoe adjusting device of the type including first and second strut members adapted to extend between brake shoes, said first strut member having a threaded stem portion slidably received in a bore in said second strut member, an adjusting nut screw-threadingly engaging said threaded stem portion of said first strut member and abutting said second strut member, said adjusting nut having exterior ratchet teeth, a hand brake lever operably connected to one of the brake shoes, said hand brake lever having a stop, a pin extending into said hand brake lever, said pin having a stem portion and an enlarged head portion spaced from said hand brake lever by said stem portion, an adjusting lever pivotally mounted about said stem portion of said pin between said hand brake lever and said head portion, said adjusting lever having at a first end thereof a pawl engaging said ratchet teeth of said adjusting nut, said adjusting lever having at a second end thereof a projection abutting said stop of said hand brake lever, tension spring means connected to said hand brake lever and to said adjusting lever for urging said projection of said adjusting lever into engagement with said stop of said hand brake lever, and said enlarged head portion of said pin being spaced from said hand brake lever by a clearance to allow movement of said adjusting lever with respect to said stem portion of said pin sufficient to enable said pawl to move into and out of engagement with said ratchet teeth of said adjusting nut, the improvement comprising:

projection means, located closely adjacent the outer peripheral surface of said stem portion of said pin, for substantially restricting said movement of said adjusting lever with respect to said stem portion of said pin to rotation about a linear axis extending through said stop of said hand brake lever and through the longitudinal axis of said pin, and for insuring that said projection of said adjusting lever remains in abutment with said stop during said rotation.

2. The improvement claimed in claim 1, wherein said adjusting lever is pivoted to said pin at a position of said adjusting lever offset from a straight line between said projection and said pawl.

3. The improvement claimed in claim 1, wherein said longitudinal axis of said pin extends transverse to the general plane of the webs of the brake shoes.

4. The improvement claimed in claim 1, wherein said projection means comprises a projection formed on said enlarged head portion of said pin and extending therefrom toward said adjusting lever at a location on said linear axis.

5. The improvement claimed in claim 1, wherein said projection means comprises a projection formed on said adjusting lever and extending therefrom toward said enlarged head portion of said pin at a location on said linear axis.

6. The improvement claimed in claim 1, wherein said projection means comprises a projection provided between said hand brake lever and said adjusting lever at a location on an extension of said linear axis.

7. The improvement claimed in claim 1, further comprising a substantially C-shaped spacer positioned on said stem portion of said pin between said adjusting lever and said enlarged head portion of said pin, and wherein said projection means comprises a projection on said spacer and extending therefrom toward said adjusting lever at a location on said linear axis.

* * * * *